United States Patent [19]

Nilssen

[11] Patent Number: 4,626,953
[45] Date of Patent: Dec. 2, 1986

[54] DOUBLY OVERLOAD-PROTECTED POWER DISTRIBUTION SYSTEM

[76] Inventor: Ole K. Nilssen, Caesar Dr., R.R. 5, Barrington, Ill. 60010

[21] Appl. No.: 605,479

[22] Filed: Apr. 30, 1984

[51] Int. Cl.[4] .............................................. H02H 7/12
[52] U.S. Cl. ........................................ 361/63; 307/31; 307/86; 307/157; 315/119; 361/93
[58] Field of Search ..................... 361/93, 94, 100, 62, 361/63, 65; 307/17, 24, 31, 86, 157, 34, 97; 315/119, 127, 225, 224; 363/56, 55, 57, 58, 50, 96

[56] References Cited

U.S. PATENT DOCUMENTS

| | | | |
|---|---|---|---|
| 3,070,728 | 12/1962 | Edmunds | 361/63 |
| 3,171,112 | 2/1965 | Martin | 361/93 X |
| 4,210,846 | 7/1980 | Capewell et al. | 315/127 X |
| 4,439,803 | 3/1984 | Baba | 361/63 |
| 4,455,509 | 6/1984 | Crum et al. | 361/93 X |

Primary Examiner—A. D. Pellinen
Assistant Examiner—Jeffrey A. Gaffin

[57] ABSTRACT

A power distribution system consists of an inverter means providing power to a plurality of separate outputs, with each separate output being protected by its own individual overload protection means. In case more than a pre-determined rate of power has been drawn from one of these separate outputs for longer than a pre-determined time, the associated individual overload protection means acts to remove the power from this particular output—without affecting the other outputs. However, if for some reason the individual overload protection means for that particular output fails to operate within the pre-determined time, a second overload protection means operates to disable the inverter, thereby to remove power from all the separate outputs.

14 Claims, 4 Drawing Figures

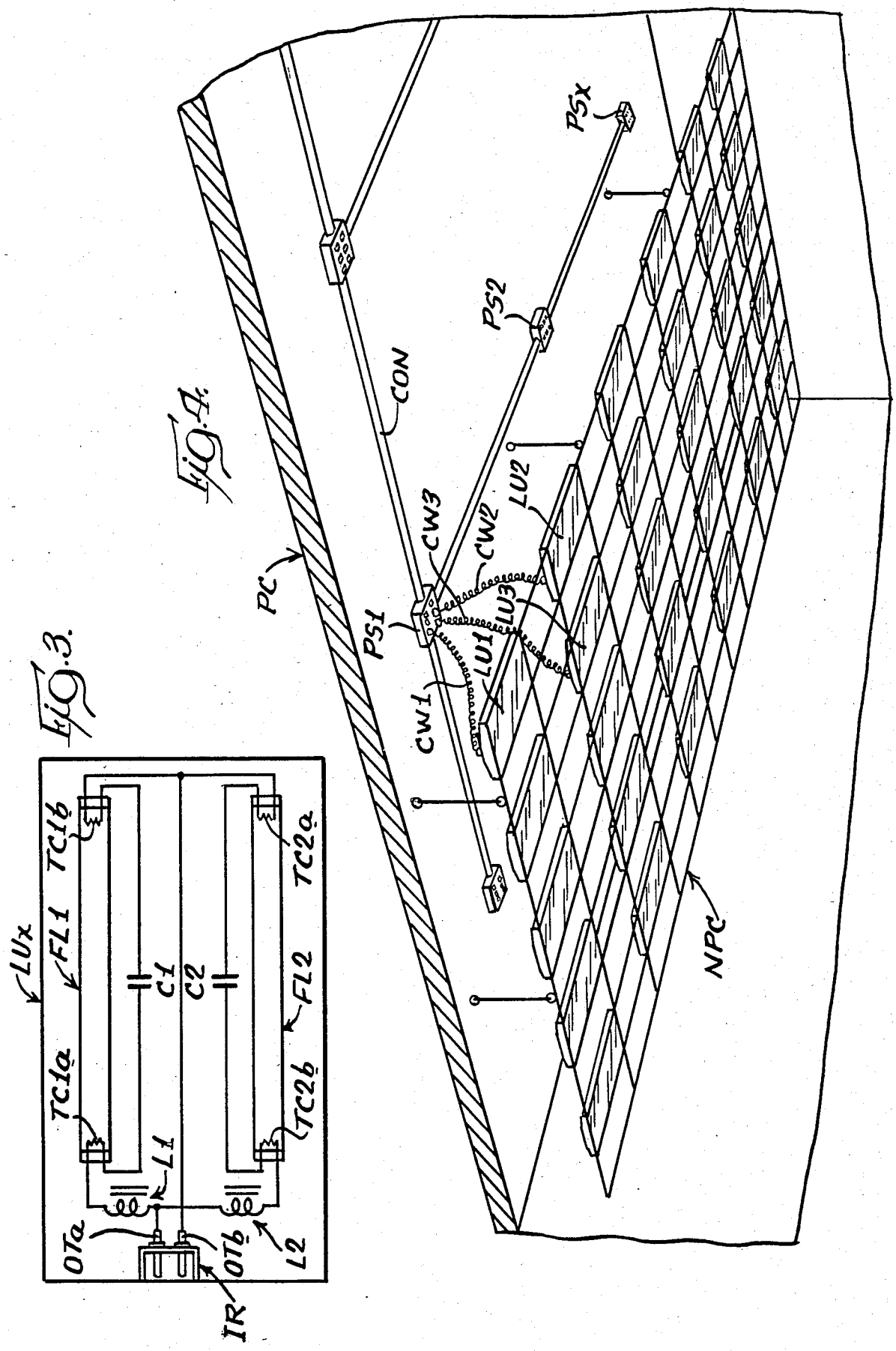

4,626,953

DOUBLY OVERLOAD-PROTECTED POWER DISTRIBUTION SYSTEM

BACKGROUND OF THE INVENTION

1. Field of Invention

The present invention relates to power-line-operated overload-protected power distribution systems in general, and to doubly overload-protected high-frequency lighting systems in particular.

2. Description of Prior Art

High-frequency lighting systems have been described in several prior art references, such as for instance in U.S. Pat. No. 4,207,497 to Capewell et al, or in U.S. Pat. No. 4,207,498 to Spira et al. In all of these systems, high-frequency power is distributed in the same fashion as in conventionally done with ordinary low-frequency power supplied directly from the power line. That is, the high-frequency power is distributed from a central source to the various high-frequency lighting fixtures by way of a single pair of output terminals and a single pair of high-frequency conductors—with all the fixtures connected with this single pair of conductors at spaced-apart points therealong.

3. Related Patent Application

The applicant of the present application has a co-pending patent application, Ser. No. 573,423 filed on Jan. 24, 1984, in which is described another form of high-frequency lighting system—a form in which high-frequency power is distributed to a plurality of individual lighting fixtures from a central source by way of a plurality of separate pairs of output terminals and a like plurality of separate pairs of high-frequency conductors. That is, each individual lighting fixture is powered directly from the central source by way of a separate dedicated pair of conductors.

4. Rationale of Invention

When powering a number of lighting fixtures from a central high-frequency source, which normally would comprise electronic converter means, it is important to effectively protect this source against overload—especially in situations where these fixtures contain series-resonant-loaded gas discharge lamps.

This issue has not been effectively dealt with in prior art, and especially not for the case where a plurality of lighting fixtures are separately and individually powered directly from a plurality of separate and individual outputs of a central high-frequency power source.

The instant invention is aimed at providing a cost-effective resolution to this issue.

SUMMARY OF THE INVENTION

1. Objects of the Invention

A first object of the present invention is that of providing an improved overload-protected power distribution system.

A second object is that of providing a doubly overloadprotected high-frequency lighting system.

A third object is that of providing a high-frequency lighting system wherein each one of a plurality of lighting fixtures is individually powered from a separate power output of a central source of high-frequency power, and where said source is redundantly protected against overload.

These as well as other objects, features and advantages of the present invention will beome apparent from the following description and claims.

2. Brief Description

In its preferred embodiment, subject invention constitutes a high-frequency lighting system consisting of the following principal component parts:

(a) a number of power-line-operated central power supplies, each such power supply having a plurality of individual output receptacles, each output receptacle providing a high-frequency output voltage, and each power supply having double protection against overload;

(b) for each power supply, a plurality of high-frequency lighting fixtures, each such lighting fixture comprising one or more gas discharge lamps and a matching network operative to derive the requisite lamp operating voltages and currents from the output voltage of one of the power supply's individual output receptacles; and (c) for each fixture, a pair of conductor wires adapted to provide for electrical connection between that fixture and one of the power supply's individual output receptacles.

The double overload protection is achieved by way of two independent overload protection means: a first one that is operative to remove power output from any one output receptacle from which more than a certain power has been drawn for more than a pre-determined brief period of time; and a second one that, in case the first one fails to operate, is operative to remove power from all the output receptacles.

BRIEF DESCRIPTION OF THE DRAWINGS

FIG. 3 schematically shows electrical circuit details of an individual fluorescent lighting fixture.

FIG. 4 illustrates an installation of subject high-frequency lighting system.

DESCRIPTION OF THE PREFERRED EMBODIMENT

Details of System and Circuits

Figure 1:
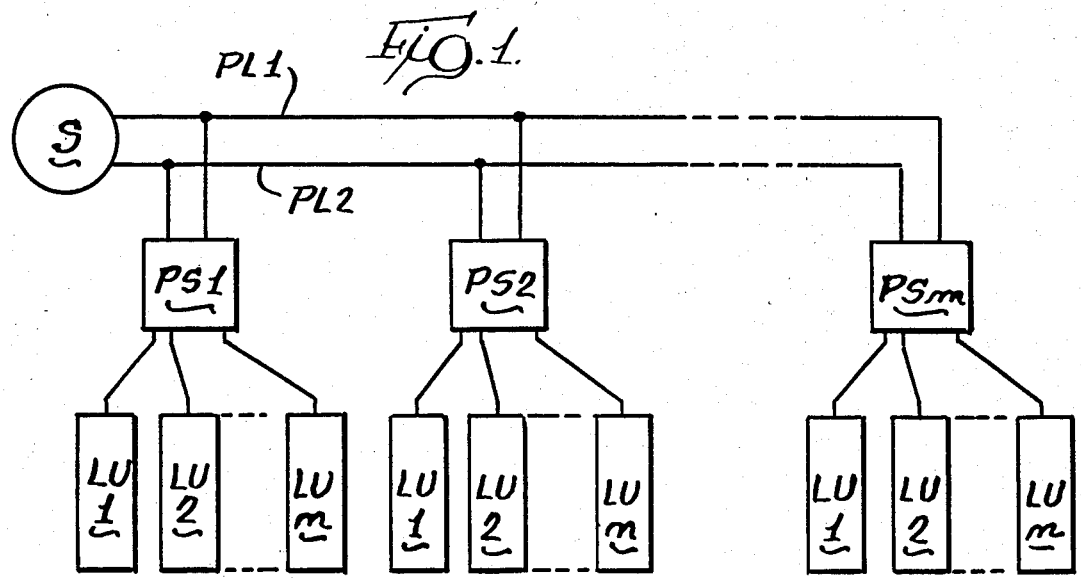
FIG. 1 schematically illustrates the preferred embodiment of the invention and shows a number of power supplies, each providing a plurality of separate high-frequency outputs for operation of a like plurality of individual loads, which in this case are lighting fixtures.

In FIG. 1, a source S of 120 Volt/60 Hz voltage is applied to a pair of power line conductors PL1 and PL2. Connected at various points along this pair of power line conductors are a number m of power-line operated inverter power supplies PS1, PS2–PSm.

To each such power-line-operated power supply are connected a variable number n of lighting units LU1, LU2–LUn. (The number n may be different for different power supplies and/or at different times.)

Figure 2:
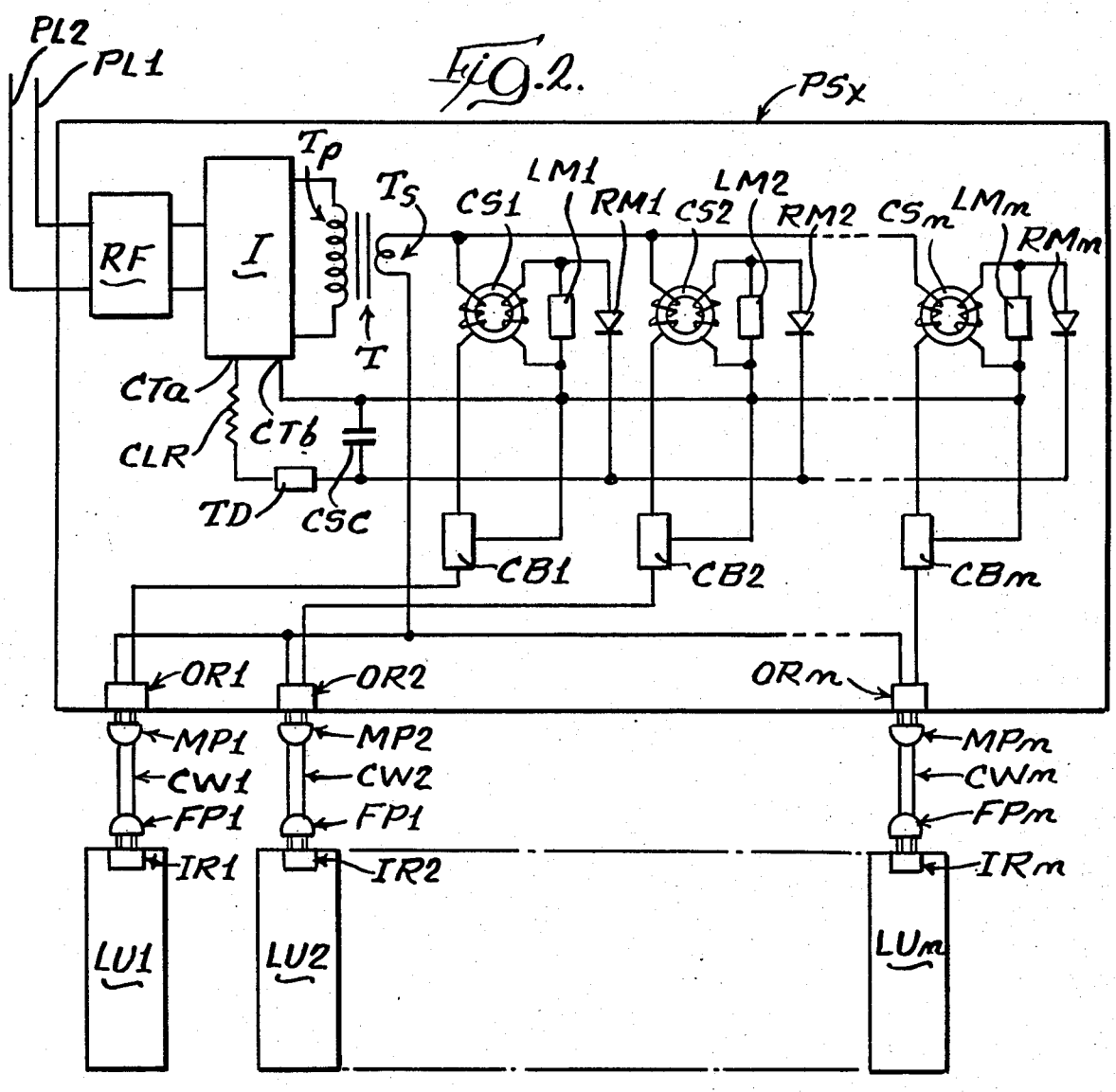
FIG. 2 schematically illustrates the preferred embodiment of one of these power supplies with its plurality of high-frequency output receptacles as well as with its individual connections to a corresponding plurality of lighting fixtures.

FIG. 2 illustrates in further detail one of the power supplies of FIG. 1 and its associated n lighting units. This one power supply is referred to as PSx, and is powered from power line conductors PL1 and PL2.

Inside PSx, power line conductors PL1 and PL2 are directly conected with a rectifier-filter combination RF, the substantially constant DC output voltage of which is applied to an inverter I; which inverter has a pair of control terminals CTa and CTb operative to disable the inverter by application thereto of a disable current.

The output from inverter I is a 30 kHz AC voltage, which AC voltage is applied to the primary winding Tp of an isolating transformer T.

The output of transformer T is provided from its secondary winding Ts and is a 30 kHz AC voltage of approximately 100-150 Volt RMS magnitude.

By way of a number n of current sensors CS1, CS2-CSn and circuit breakers CB1, CB2-CBn, the transformer output voltage is supplied to a number n of power output receptacles OR1, OR2-ORn, all respectively.

Each current sensor is connected with a load means LM1, LM2-LMn; and the outputs from the loaded current sensors are applied by way of rectifier means RM1, RM2-RMn to a common charge-storing capacitor CSC. The output from CSC is applied by way of a threshold device TD, which is connected in series with a current-limiting resistor CLR, to control terminal CTa on inverter I.

By way of male plugs MP1, MP2-MPn, conduction wire-pairs CW1, CW2-CWn, and female plugs FP1, FP2-FPn, the female output receptacles OR1, OR2-ORn are connected with male input receptacles IR1, IR2-IRn on lighting units LU1, LU2-LUn, all respectively.

The assembly consisting of rectifier and filter means RF, inverter I, transformer T, current sensors CS1, CS2-CSn, load means LM1, LM2-LMn, rectifier means RM1, RM2-RMn, capacitor CSC, threshold device TD, resistor CLR, circuit breakers CB1, CB2-CBn, and the n output receptacles OR1, OR2-ORn, is referred to as power supply PSx.

FIG. 3 illustrates one of the n lighting units referred to in FIG. 2 as LU1, LU2-LUn. This one lighting unit is referred to as LUx. It has a power input receptacle IR, which has two output terminals OTa and OTb, and comprises a pair of fluorescent lamps FL1 and FL2, a pair of corresponding ballasting inductors L1, L2 and ballasting capacitors C1, C2.

Fluorescent lamp FL1 has two thermionic cathodes TC1a and TC1b; and fluorescent lamp FL2 has two similar cathodes TC2a and TC2b.

Inductor L1 is connected between output terminal OTa and one of the terminals of cathode TC1a. Capacitor C1 is connected between the other terminal of cathode TC1a and one of the terminals of cathode TC1b. The other terminal of cathode TC1b is connected with output terminal OTb.

Inductor L2 is connected between output terminal OTa and one of the terminals of cathode TC2a. Capacitor C2 is connected between the other terminal of cathode TC2a and one of the terminals of cathode TC2b. The other terminal of cathode TC2b is connected with output terminal OTb.

FIG. 4 illustrates an expectedly typical installation in a building of subject lighting system. The power line conductors are provided by way of conduit CON to a number of different power supplies: PS1, PS2, and PSx.

These power supplies are mounted (in a way similar to that of regular electrical junction boxes) onto the permanent ceiling PC. Suspended from this permanent ceiling is a non-permanent ceiling NPC; which non-permanent ceiling is an ordinary so-called suspended ceiling, which has a grid structure of suspended T-bars with ceiling panels and lighting fixtures used for filling in the openings in the grid structure. For sake of clarity, the suspended ceiling is shown without the ceiling panels.

From each of the power supplies, a plurality of conduction wire-pairs provided for light-weight flexible plug-in connection with a like plurality of lighting units. However, for sake of clarity, only a few connections are specifically shown: From power supply PS1, connect wires CW1, CW2 and CW3 are shown to connect with lighting units LU1, LU2 and LU3.

Description of Operation

The operation and use of the subject lighting system may be explained as follows.

In FIG. 1, the pair of power line conductors PL1 and PL2 provides 120 Volt/60 Hz power to each and every inverter power supply: PS1, PS2-PSm.

Each of these inverter power supplies (Ex: PSx) converts its 120 Volt/60 Hz input voltage to a high-frequency output voltage; which output voltage is transformed by a transformer (T) to a magnitude of 100-150 Volt RMS and is supplied to each one of the plurality of output receptacles (Ex: OR1). The load current flowing to each of these output receptacles passes through a current sensor (Ex: CS1) and a circuit breaker (Ex: CB1); which, in combination, provide for distinct limitations on the magnitude of load current that can be supplied to any given output receptacle.

The current sensor (CS1), which is simply a small high-frequency current transformer of conventional design, senses the load current flowing through it and provides a proportional sensor output current at its output. This sensor output current is fed into a load means (LM1), which then develops across it a sensor AC output voltage of magnitude substantially proportional to that of the load current flowing through the current sensor.

The sensor AC output voltage is rectified by a rectifier means (RM1), and the resulting sensor DC output current is applied to the charge-storing capacitor (CSC). Thus, this capacitor will eventually charge up to a DC voltage of magnitude proportional to that of the peak amplitude of the largest one of the various load currents flowing through the various current sensors (CS1, CS2-CSn) and to the different power output receptacles (OR1, OR2-ORn), with the time required to reach this magnitude being dependent on the magnitude of the capacitance of CSC, as well as on the net magnitude of the sum of all the resulting sensor DC output currents.

After the DC voltage across capacitor CSC reaches a certain threshold magnitude, the threshold device (TD) breaks down, and disable current from capacitor CSC is then provided, by way of the current-limiting resistor (CLR), to control terminal CTa of inverter I. (The threshold device could be a Diac, such as ST-2 from General Electric, which would have a break-down or threshold voltage of about 30 Volt.)

As soon as disable current is supplied to control terminal CTa, the inverter becomes disabled and the 30 KHz inverter output voltage disappears; which, of course, reduces the various load currents to zero.

The disablement of the inverter is accomplished by way of well known means, the details of which are herein omitted for the reason of overall clarity. In particular, the disablement is accomplished by way of an electrically actuatable switch means comprised within the inverter and connected in circuit with the B+ supply and the control terminals CTa, CTb. When, from the outside, the inverter is provided with a disable current by way of terminal CTa, this built-in switch means acts to prevent the flow of B+ current within the inverter, thereby stopping inverter operation. After having been disabled, the inverter will resume its operation again as soon as the magnitude of the disable current falls below a certain threshold level. (Of course, if required, it would readily be possible to provide for a latching effect, whereby the inverter would remain out of operation until line power is removed and then restored again.)

As with the current sensor (CS1), the circuit breaker (CB1) is also responsive to the current flowing through it. In particular, the circuit breaker is a normally-closed thermally-activated bimetallic switcher that operates to latch itself into an open-circuit position in case the current flowing through it exceeds a certain pre-established RMS magnitude for more than a few seconds. After having latched itself into such an open-circuit position, power has to be removed to cause it to reset.

The purpose of the circuit breakers (Ex: CB1) within the various power supplies (Ex: PSx) is that of removing power from a given output receptacle (Ex: OR1) in case an excess current (i.e., more than 1.0 Amp) flows for longer than a brief period of time (i.e., for longer than about two to six seconds).

The purpose of the current sensors (Ex: CS1) is that of providing a relatively slow-acting back-up means for removing power from the output in case too much current (i.e., more than about 1.0 Amp) is flowing from at least one output receptacle for too long a time (i.e., for longer than about ten to thirty seconds).

Thus, in case of an overload condition caused by a given lighting unit (among the plurality of lighting units powered from a single power supply), the power supplied to that given lighting unit will be interrupted by way of the particular circuit breaker associated with the given lighting unit—leaving the remaining lighting units unaffected. However, if for some reason that particular circuit breaker were to malfunction (thereby leaving the overload condition in effect for a period of more than a few seconds), the power supply would be disabled by way of disabling the inverter I in the power supply PSx. Of course, in this case, the power to all the lighting units powered by that power supply would be interrupted.

After having been disabled, the inverter will remain disabled for a time-period TP, which will last until the disable current flowing from the charge-storing capacitor CSC has diminished below a certain threshold level. The length of time-period TP can routinely be designed to be as short or as long as desired. In the preferred embodiment herein, the time-period TP was chosen to be about five minutes.

However, it is also routinely possible to arrange for the inverter to become disabled in a latched fashion—using the power line voltage for the latching function. In this case, provided that the time-period TP is designed to be just a few seconds long, the inverter may be re-started at any time after having been disabled by simply removing the power line voltage for a brief period.

The fluorescent lamp ballasting arrangement shown in FIG. 3 is of a high-frequency resonant-type, and operates similarly to ballasting circuits previously described in pusblished literature—such as, for instance, in U.S. Pat. No. 3,710,177 to Ward.

An important feature of these resonant or near-resonant ballasting circuits relates to the fact that they can be arranged to draw power from their source at a nearly unity (or 100%) power factor. In other words, for a given Volt-Ampere product available from a source, the resonant ballast provides for the maximum possible power to be pulled from that source.

FIG. 4 illustrates the use and installation in a building of the power-limited lighting system of FIG. 1, and shows two multi-output power supplies mounted to the permanent ceiling above a non-permanent suspended ceiling.

Each of these multi-output power supplies has a plurality of output receptacles; and each of these receptacles provides an independently current-limited (or Volt-Amp-limited) AC voltage output.

A number of lighting units (of the type described in FIG. 3, but in the form of lighting fixtures and/or lighting panels) are fitted into the grid system of the suspended ceiling—much in the fashion of ordinary ceiling panels. Each of these lighting units are then connected by way of a plug-in flexible cord with one of the Volt-Amp-limited output receptacles of one of the multi-output power supplies mounted on the permanent ceiling above the grid structure.

It is believed that the present invention and its several attendant advantages and features will be understood from the preceeding description. However, without departing from the spirit of the invention, changes may be made in its form and in the construction and interrelationships of its component parts, the form herein presented merely representing the preferred embodiment.

I claim:

1. A power conditioner adapted to be connected with and to be powered from the voltage on an ordinary electric utility power line, comprising:

an input circuit connected with said power line and operative to provide an AC voltage at a pair of AC input terminals, said input circuit having a set of control terminals and being operative upon the receipt of a disable signal at said control terminals to substantially diminish the magnitude of said AC voltage; and a plurality of pairs of AC output terminals, each one of these pairs of AC output terminals having a current sensor and being individually and separately connected with said pair of AC input terminals by way of said current sensor and operable to provide an AC output, said current sensor being: (i) operative to sense the magnitude of the current associated with said AC output, (ii) connected in circuit with said control terminals, and (iii) operable to provide a disable signal to said control terminals in case the magnitude of the current associated with said AC output exceeds a pre-determined level for more than a certain length of time;

whereby, if the magnitude of the current flowing from at least one of said pairs of AC output terminals exceeds said pre-determined level for more than said certain length of time, said AC voltage will substantially diminish in magnitude, thereby reducing the magnitude of the current associated with said AC output.

2. The power conditioner of claim 1 wherein a current-responsive circuit breaker means is connected in circuit with at least one of said separate pairs of AC output terminals and operable to diminish the flow of current from said one pair in case the magnitude of the current flowing therefrom has exceeded a pre-determined over-current protection level for longer than a very brief period of time;

whereby, if the current flowing from said one pair of AC output terminals exceeds said over-current protection level for longer than a very brief period of time, the magnitude of the current flowing from said one pair of output terminals will be diminished substantially without affecting the output provided from the other pairs of AC output terminals.

3. The power conditioner of claim 2 wherein said very brief period of time is shorter than said certain length of time.

4. The power conditioner of claim 3 wherein said very brief period of time is on the order of ten seconds or less.

5. The power conditioner of claim 1 wherein said input circuit comprises frequency converter means and wherein the frequency of said AC voltage is substantially higher than that of the voltage on said power line.

6. A power supply adapted to be powered from the voltage on an ordinary electric utility power line and comprising:

power distributing means connected with said power line and operative to provide an output voltage at each one of a plurality of separate pairs of power output terminals; and for each individual one pair of said plurality of separate pairs of power output terminals:

(a) first means responsive to current flowing from said individual one pair of power output terminals and operative to effect a reduction in the magnitude of the voltage provided across said individual pair in case the current drawn therefrom has exceeded a pre-determined magnitude for longer than a brief period of time, said reduction being effected substantially without affecting the magnitude of the voltage provided across the remianing pairs of power output terminals; and (b) second means also responsive to current flowing from said individual one pair of power output terminals and operative to prevent the magnitude of the current drawn from this individual one pair of output terminals from exceeding said pre-determined magnitude for longer than a short period of time, said short period of time being longer than said brief period of time;

whereby, even if the first means fails, the magnitude of the current available from any one of said plurality of pairs of power output terminals is limited by said second means.

7. The power supply of claim 6 wherein said power distributing means comprises frequency converter means operative to make the frequency of said output voltage substantially higher than that of the voltage on said power line.

8. An over-load protected power distribution system comprising:

an input circuit connected with the voltage on an ordinary electric utility power line and operative to provide an AC voltage at a pair of AC input terminals, said input circuit having a set of control terminals and being operative at the receipt of a disable signal at said control terminals to substantially diminish the magnitude of said AC voltage; and a plurality of pairs of AC output terminals, each one of these pairs of AC output terminals having a current sensing means and being individually and separately connected with said pair of AC input terminals by way of this current sensing means and operable to provide an AC output, said current sensing means being: (i) operative to sense the magnitude of the output current flowing from said AC output, (ii) connected in circuit with said control terminals, and (iii) operable to provide a disable signal to said control terminals in case the magnitude of said output current exceeds a pre-determined level for longer than a certain length of time;

whereby, if the magnitude of the current flowing from at least one of said pairs of AC output terminals exceeds said pre-determined level for longer than said certain length of time, said AC voltage will substantially diminish in magnitude, thereby reducing the magnitude of the current flowing from said AC output.

9. The power distribution system of claim 8 wherein a current-responsive circuit breaker means is connected in circuit with at least one of said separate pairs of AC output terminals and operable to diminish the flow of current from said one pair in case the magnitude of the current flowing therefrom has exceeded a pre-determined over-current protection level for longer than a very brief period of time;

whereby, if the current flowing from said one pair of AC output terminals exceeds said over-current protection level for longer than a very brief period of time, the magnitude of the current flowing from said one pair of output terminals will be diminished substantially without affecting the output provided from the other pairs of AC output terminals.

10. The power distribution system of claim 9 wherein said very brief period of time is shorter than said certain length of time.

11. The power distribution system of claim 10 wherein said very brief period of time is on the order of ten seconds or less.

12. The power distribution system of claim 9 wherein said input circuit comprises frequency converter means and wherein the frequency of said AC voltage is substantially higher than that of the voltage on said power line.

13. An arrangement comprising:

power supply means having an input connected with an ordinary electric utility power line and a main output operative to provide at each one of plural output receptacles an AC voltage of frequency substantially higher than that of the voltage normally present on the power line, each output receptacle having current-limiting means and current sensing means and being separately and individually prevented from supplying current of magnitude exceeding a predetermined level even if electrical connection is maintained between the main output and any of said output receptacles through said current limiting means; and a number of individual load means, each individual load means being adapted to be disconnectably connected with and powered by the AC voltage provided at one of the plural separate output receptacles.

14. A power distribution system connected with an ordinary utility power line and mounted to a ceiling, comprising:

separate individual power supplies mounted to the ceiling at spaced-apart locations, each power supply being connected with the power line and having a main output and distribution means operative to provide at each one of plural separate individual output receptacles an AC voltage of frequency substantially higher than that of the voltage normally present on the power line, each output receptacle having current-limiting means and current sensing means and being separately and individually prevented from supplying current of magnitude exceeding a predetermined level even if any of said output receptacle maintains electrical connection with said main output and distribution means through said current limiting means; and a number of separate individual load means, each load means being mounted in support relationship with the ceiling and adapted to be disconnectably connected with and powered by the AC voltage provided at one of the plural output receptacles of one of the power supplies.

* * * * *